United States Patent Office 2,782,461
Patented Feb. 26, 1957

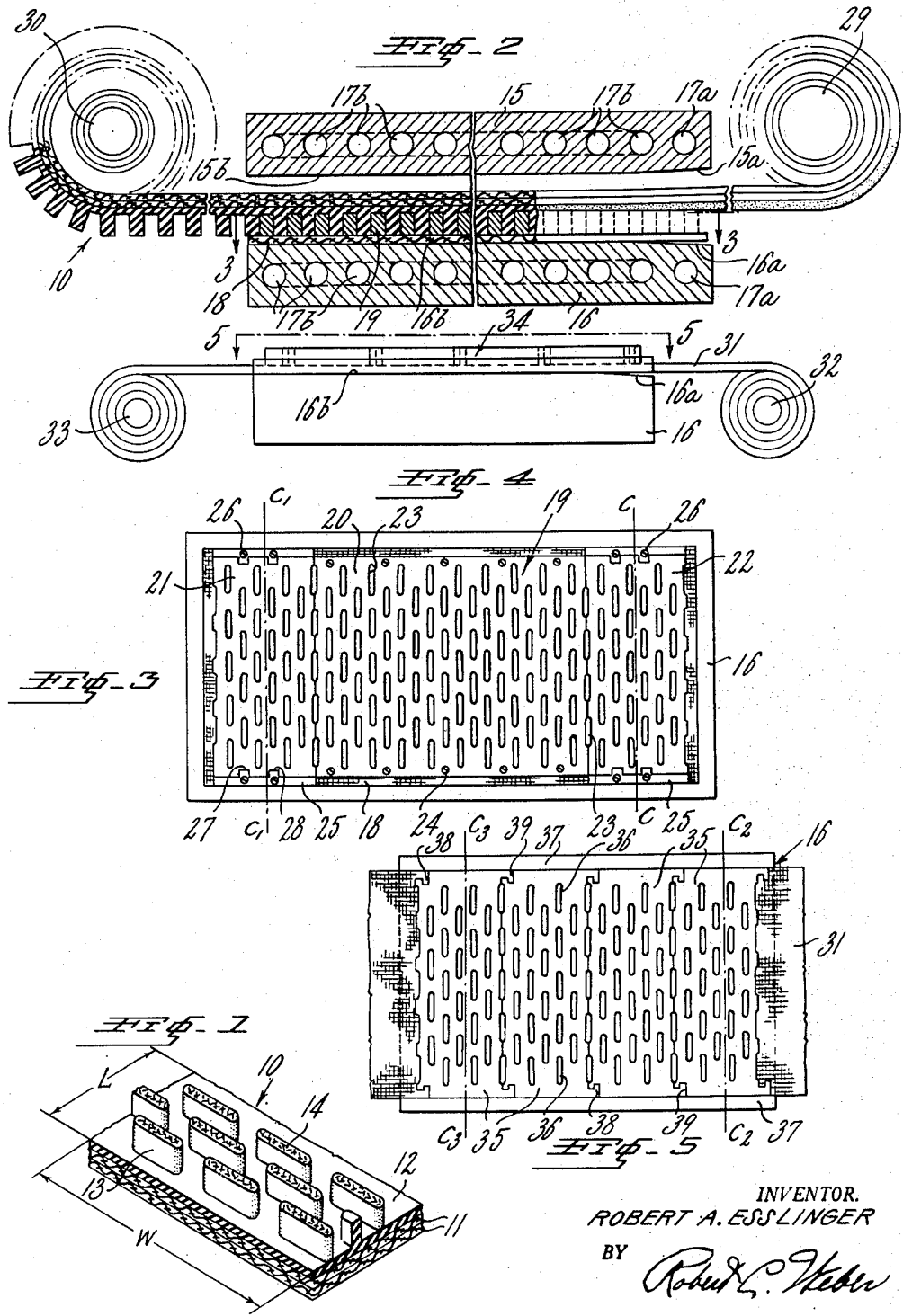

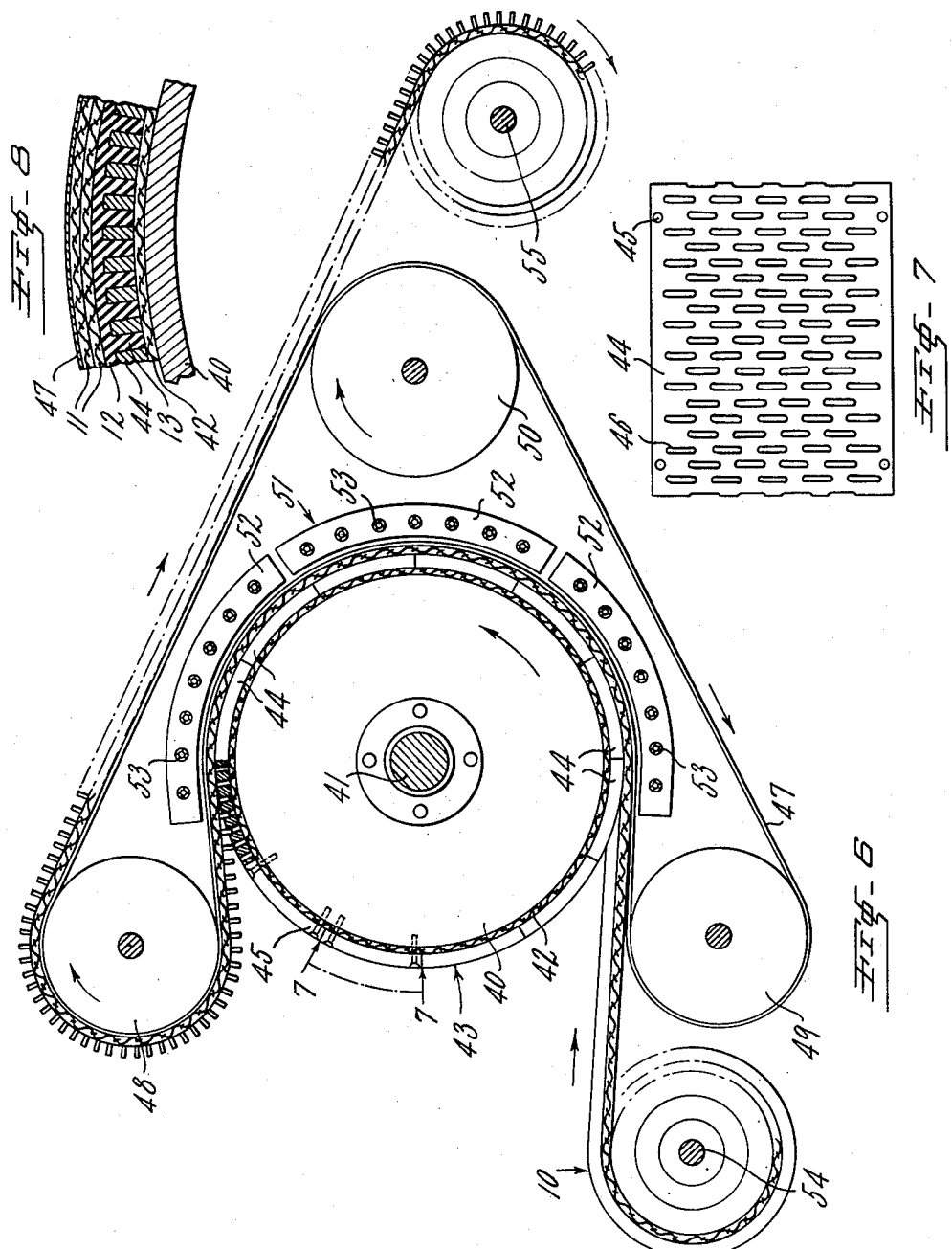

2,782,461

METHOD AND APPARATUS FOR MOLDING CONVEYOR BELTS

Robert A. Esslinger, Cresskill, N. J., assignor to United States Rubber Company, New York, N. Y., a corporation of New Jersey Application October 6, 1955, Serial No. 538,849

12 Claims. (Cl. 18—6)

This invention relates to molding surfaces of plastic materials and is especially useful in producing a patterned surface over the face of conveyor belting or other articles made of rubber or rubber-like materials.

In the manufacture of conveyor belts for handling packages it is desirable to provide the load carrying face of the belt with projections and depressions for increasing the hold of the belt on the packages. Package handling conveyor belts are of extensive area and are vulcanized in long, steam heated presses or on rotary, continuous vulcanization equipment. To provide the conventional metal molds of a size to fit such a press or rotary vulcanizer is extremely expensive.

Heretofore, such belts have been molded either in costly, all metal molds, or by embedding a coarse, woven fabric and/or wire in the face of a layer of plastic rubber composition and then using the resulting matrix with the coarse, woven fabric and/or wire face to mold the surface of the belt. Variations of the latter process are found in U. S. Patents 2,147,218 and 2,575,813. The chief disadvantage of this method is that the rubber matrices, even though reinforced with fabric and/or wire, deteriorate rapidly and must be replaced often.

The primary object of this invention is to provide new and improved methods and means for economically and efficiently molding a patterned surface over the plastic face of an article such as a conveyor belt.

Another object of this invention is to provide methods and means which utilize a reasonably priced mold comprising commercially available, punched metal plates. Such plates can be made at considerably less cost than would be required to machine a conventional type of metal mold; and they produce a molded design on the belt cover to provide the desired projections and indentations of a greater depth and uniformity, resulting in an improved product.

A further object of the invention is to provide methods and means which simplify the manufacture of such a product by utilizing a suitable, porous pad on the side of the mold opposite the item to be molded, to allow for the escape of gas trapped in the molding process, thus giving a better finished product and greatly reducing the necessity for repairs subsequent to molding. Such a pad also acts to restrict overflow of the plastic material and to substantially prevent the formation of flash on the carrying surfaces of the belt cover, because it effectively seals the perforations in the mold plate. Further, the porous pad provides a roughened, fabric-like impression on the carrying surface of the basic molded design which contributes to the increased hold of the belt on the packages.

Still another object of the invention is to provide methods and means for molding an article having a patterned holding surface of plastic material suitable for use not only as a conveyor belt, but also as matting, pulley lagging, shoe soles, roll covering, shock padding, and the like.

Other objects and advantages of the invention will become apparent upon a consideration of the following specification and claims when read in conjunction with the accompanying drawings wherein:

Fig. 1 is a perspective view of an article which may be produced by the methods and means embodying the invention, and which is adapted for use as a conveyor belt, Fig. 2 is a schematic view partially in section, illustrating one method and means embodying the invention and adapted to mold the belt of Fig. 1;

Fig. 3 is a horizontal sectional view taken on line 3—3 of Fig. 2;

Fig. 4 is a schematic view of another method and means embodying the invention, and represents a modification of the method and means of Fig. 2;

Fig. 5 is a horizontal sectional view taken on line 5—5 of Fig. 4;

Fig. 6 is a schematic view of still another method and means embodying the invention and adapted to mold the belt of Fig. 1;

Fig. 7 is a sectional view taken on line 7—7 of Fig. 6; and

Fig. 8 is an enlarged view of a portion of Fig. 6.

Referring to Fig. 1, there is illustrated an article in the form of a conveyor belt 10, which comprises a carcass 11 and a cover 12. The carcass 11 is preferably composed of one or more layers of fabric which have been impregnated with rubber and plied up in a conventional manner. The cover 12 preferably comprises a sheet of calendered rubber which is rolled onto the carcass 11 to form an assembly, which is then molded to form the integral belt 10. In its finished state, the cover 12 is provided with a plurality of integral rubber nubs or projections 13 which form the package holding surface and are provided with a fabric-like impression 14 on their top surfaces, for additional holding action. In the particular embodiment illustrated, these nubs 13 are preferably oblong and arranged with their longitudinal axes transverse to the length L and direction of movement of the belt 10. It is also preferred that the nubs 13 be arranged in rows across the width W of belt 10, the nubs in each row being staggered with respect to those in the adjacent row to provide the optimum bearing area for frictionally supporting the packages being transported. In addition, the nubs 13 are preferably spaced from each other to facilitate drainage of moisture often encountered in outside installations.

One method and means for producing belt 10 is shown in Fig. 2. The apparatus comprises upper and lower belt-forming platens 15 and 16 which are mounted for movement relative to each other in a conventional molding press (not shown). Platens 15 and 16 are tapered in the conventional manner at their inlet ends 15a and 16a which are water-cooled by channels 17a, while the major portions of the platens have oppositely disposed, flat and parallel surfaces 15b and 16b, which are heated by channels 17b, for a purpose to be described below. Lower platen 16 is provided with a porous pad 18 which may be made of woven fabric, wire, sintered metal, paper, open-celled sponge rubber, or any other suitable material which will permit the passage of air, but restrict the passage of the plastic material being molded. Over pad 18 is mounted the mold 19, which, as seen in Fig. 3, comprises a center plate 20 and two end plates 21, 22, each of which are provided with a plurality of perforations 23 corresponding to the nubs 13, shown in Fig. 1. As will be apparent, the perforations 23 at the junctures of plates 20, 21, and 22 match those in each plate and are formed along the parting lines of the plates, so that any flash which may be formed between the plates will not be readily noticeable in the finished product. This practice is also followed in the construction of the mold plates illustrated in Figs. 5 and 7.

The center mold plate 20 in Fig. 3 is rigidly secured to lower platen 16 by screws 24 which also pass through pad 18. The end plates 21, 22 are removably positioned on platen 16 by guides 25 which are secured to the platen by screws 26. For properly locating end plates 21, 22, each is provided with slots 27 for receiving lugs 28 on guides 25. To remove plates 21, 22 it is only necessary to lift them off pad 18 until lugs 28 and slots 27 are disengaged.

Referring back to Fig. 2, the method of molding belt 10 will now be described. The uncured belt 10, comprising carcass 11 and cover 12 which have been plied up as noted above, is wound upon roll 29 which is located to one side of platens 15 and 16. The uncured belt 10 is then fed between heated platens 15 and 16 which are closed under pressure to mold a section of the carcass 11 and cover 12 as an integrally bonded unit. Simultaneously, the major portion of cover 12 is forced by platen 15 into the perforations 23 of mold 19 to form nubs 13. As this occurs, any air or gas which might ordinarily be trapped between mold 19 and platen 16 is permitted to escape through the interstices in the porous pad 18. The use of such a pad is particularly advantageous because the plastic material is permitted to completely fill perforations 23 without the formation of any air or gas bubbles in nubs 13. In addition, pad 18 substantially prevents any formation of flash on the upper surfaces 14 of nubs 13, because it effectively seals perforations 23 and thus restricts overflow of the plastic material between the mold 19 and platen 16. Moreover, the pad 18 produces a roughened, fabric-like impression on surfaces 14 of nubs 13, which increases the holding action of the belt 10 on the packages.

When one section of belt 10 is completely molded, platens 15 and 16 are opened to permit molding of the next section. This is accomplished as follows. The advance portion of belt 10 is stripped from end plate 21 and center plate 20; the end plate 21 is removed from its original position on platen 16; the end plate 22 and the overlying portion of belt 10 are lifted together from platen 16, relocated in the original position of plate 21, and plate 21 is then located in the position plate 22 originally occupied. As will be apparent, this permits the next section of the belt 10 to be molded, the previously molded section being wound up on roll 30.

Ordinarily, in progessively molding sections of belt 10, one would expect that the entire molded section be stripped from mold 19 rather than following the aforementioned procedure. Such is necessary, however, when using conventional, steam-heated molding presses because the inlet ends 15a and 16a of the press platens 15 and 16 are preferably tapered and cooled to a lower temperature than the remaining portions 15b and 16b. The tapered ends 15a, 16a prevent the underlying section of belt 10 from squeezing out and forming a ridge or bump adjacent the uncured section being fed from roll 29, and these tapered ends are cooled by channels 17a to prevent permanently molding a taper into belt 10. Accordingly, it is necessary to cure the tapered portion of the belt section later, between the flat surfaces 15b, 16b adjacent the left end of platens 15 and 16.

As seen in Fig. 3, the section of the belt 10 which is fully cured in each molding operation is that lying between the left end of platens 15, 16 and line C—C. The tapered portion of belt 10 which lies to the right of line C—C is not cured with the aforesaid section, but in the next molding operation, during which it is located between the left end of center plate 20 and line $C_1$—$C_1$. This procedure causes a small area of the belt to be "double cured," which is not harmful to the belt but is somewhat wasteful. The area in question is that which originally lies between the right end of center plate 20 and line C—C during one molding operation, but which is then repositioned to lie between the left end of platens 15, 16 and line $C_1$—$C_1$ for the subsequent molding cycle. Since it is necessary to strip plate 22 and belt 10 from pad 18 in advancing the belt, there will be some flash formed on the nubs 13 originally lying to the right of center plate 20, because the seal between the perforated plate 22 and pad 18 is broken. However, this area is relatively small in comparison to the total surface being molded.

A modification of the aforementioned molding means and method is illustrated in Figs. 4 and 5. Referring to Fig. 4, lower platen 16 is shown on a slightly smaller scale than in Fig. 2 and the porous pad 31, which may be made of any of the flexible materials used for pad 18, is not fastened to the platen, but merely rests thereon, being progressively fed from feed roll 32 to windup roll 33. Supported upon pad 31 is the mold 34 which comprises a plurality of interlocking mold plates 35 having perforations 36. As seen in Fig. 5, platen 16 is provided with guides 37 between which the pad 31 and plates 35 travel. In order to lock plates 35 together, each is provided with tongues 38 at one end and grooves 39 at the other end, the tongues 38 and grooves 39 of adjacent plates 35 mating with each other.

In practicing this modified method, upper platen 15, and rolls 29, 30 are employed as shown in Fig. 2 and the platens 15 and 16 are closed, as previously described, to mold belt 10, section by section. However, after a belt section is molded and platens 15 and 16 are opened, the rolls 30 and 33 are operated simultaneously to advance the belt 10, plates 35 and pad 31 together, approximately one press length. As the pad 31 and plates 35 move off the press together the belt 10 is stripped therefrom, until the last plate 35 at the right end of the platens 15 and 16 is located at the left end thereof. Just as in Fig. 4, the belt area between the left end of platen 16 and line $C_2$—$C_2$ is fully cured in one molding operation; the uncured tapered portion lying to the right of line $C_2$—$C_2$ is compressed and cured adjacent the left end of platen 16 in the subsequent molding cycle; while the portion of belt 10 originally lying between line $C_2$—$C_2$ and the left end of the underlying plate 35, is "double cured" upon being repositioned between line $C_3$—$C_3$ and the left end of platen 16. However, the part of belt 10 overlying the last plate 35 is not stripped from its plate, nor the plate removed from pad 31 until the overlying belt section is fully cured at the left end of the platens. As the belt 10 is being advanced, the used plates 35, or another set of plates 35, are repositioned in interlocking engagement with each other and the last plate, for the next molding operation.

This method and means has an advantage over those first described in that the seal between the porous pad 31 and mold 34 is never broken before each section of belt 10 is completely molded. Since the mold plates 35 and pad 31 can move together as a unit with respect to platen 16, the last plate 35 and the underlying portion of pad 31 do not change position relative to one another, thereby maintaining the seal therebetween until the overlying belt portion is completely cured. As a consequence, there will be substantially no overflow of the uncured cover 12 between plates 35 and pad 31, and thus little or no flash will be formed on surfaces 14 of nubs 13 over any area of belt 10, as was the case in Figs. 2 and 3.

Referring now to Fig. 6, there is shown a third means and method for molding belt 10, which shall be identified as the rotary, continuous cure, as contrasted with the flat, intermittent cures previously described and referred to in Figs. 1 through 5. The apparatus, which may be somewhat similar to that described in U. S. Patent 2,446,771, comprises a hollow, cylindrical, steel drum 40 mounted for rotation on a shaft 41 and coupled to a steam line by means of which the drum is heated to the desired temperature. The length, diameter and rotational rate of drum 40 may be varied as desired for the particular article being molded. Mounted on the circumference of drum 40 is the porous pad 42, similar to pads 18 and 31. Over pad 42 is the mold 43, which comprises a plurality of perforated plates 44, similar to plate 20. The pad 42 and mold 43 are rigidly secured to drum 40 for rotation therewith by means of screws 45. As seen in Fig. 7, the plates 44 are provided with nub-forming perforations 46.

A thin and flexible, endless steel pressure band 47 is looped about a top roll 48, a bottom roll 49, a back roll 50 and passes over the surface of drum 40 for more than 180°. As will be apparent from Fig. 6, the band 47 moves relative to the rotating drum 40 as the former travels over rolls 48, 49 and 50, but it also moves with the drum in an extended, arcuate pressure path, along which molding of the belt 10 occurs. The back roll 50 is mounted in adjustable bearings (not shown) by means of which the back roll 50 can be moved to and from the drum 40 in order to vary the pressure of the band 47 upon the surface of drum 40. Mounted externally of the drum 40 and pressure band 47 is a heat transfer jacket 51 of three segments 52. In each segment there are disposed a number of coils 53 through which steam may be passed in order to provide the proper amount of heat to the pressure band 47 and the uncured belt 10, in conjunction with the steam heated drum 40, which heats the mold 43.

If desired, high temperature steam may be passed through lower segment 52, steam at a lower temperature through the middle segment, and a refrigerant through the upper segment. This would be preferred when molding a thermoplastic resin such as polyvinyl chloride to produce a stable product. However, for most rubber or rubbery materials, each segment may be heated equally to reduce the "curing" time since such products are thermosetting and remain stable upon air cooling. Moreover, proper compounding will substantially eliminate air bubble formation within the uncured material itself so that for many plastic materials, whether thermosetting or thermoplastic, the cooling cycle can also be eliminated.

In front of the machine is a roll 54 upon which is wound up the uncured belt 10, and the belt is fed into the bite between pressure band 47 and mold plates 44 on drum 40. When the process is to be carried out, any suitable device such as an electric motor (not shown) may be employed to set the drum 40 in motion and to drive one of rolls 48, 49 or 50, to cause the band 47 to move with the drum 40 and at the same speed as the surface speed of mold plates 44 attached thereto. As the drum 40, belt 10 and band 47 move together along the arcuate pressure path, the carcass 11 and cover 12 are cured under heat provided by drum 40 and jacket 51, and pressure provided by band 47 and drum 40. Simultaneously, the major portion of cover 12 is forced through perforations 46 by band 47 and into contact with pad 42 to form nubs 13. Fig. 8 illustrates this action and the relationship between band 47, belt 10, mold 43, pad 42 and drum 40, during the molding operation. Just as in Figs. 1 through 5, the porous pad 42, which may be made of any of the materials used for pad 18, permits the escape of air, seals the mold plates 44 against overflow and forms a roughened, fabric-like impression on surfaces 14 of nubs 13.

As the belt 10 is fed over top roll 48 together with band 47, it is fully cured and automatically stripped from the mold plates 44. After being separated from band 47 which passes on over back roll 50 to continue the molding operation, the belt is wound up on roll 55.

It will now be apparent that the rotary, continuous cure has numerous advantages over the flat, intermittent cures, and chief among these are the following. The continuous feature not only increases the production rate and eliminates "double curing" of portions of the belt, but also produces a better appearing product because the formation of flash on nubs 13 is substantially eliminated. Although the flat cure illustrated in Figs. 4 and 5 also substantially eliminates such flash, it still requires a "double cure" over part of the belt and lacks continuity, each of which limits the production rate. In addition, the rotary feature eliminates the extra, manual steps of relocating the mold plates and stripping the cured belt from the mold, as required in the flat cures of Figs. 1 through 5, because these steps are automatically performed by the apparatus of Fig. 6.

It is to be understood that the various means and methods described herein are not limited to the molding of the rubber belt illustrated in Fig. 1, but can readily be adapted to produce any raised design formed by means of perforations in a flat or arcuate mold plate and, as stated previously, can be used to produce a design on a number of different articles made of plastic material. The term "plastic material" as used herein, includes elastomers such as natural or synthetic rubber, as well as suitable thermosetting or thermoplastic resins.

While the various methods and means embodying the invention have been shown and described in certain preferred forms, it is to be further understood that various changes and modifications may be made therein by those skilled in the art without departing from the principles of the invention, the scope of which is to be determined by the appended claims.

Having thus described my invention, what I claim and desire to protect by Letters Patent is:

1. In apparatus for molding plastic material under heat and pressure, a pair of relatively movable pressure members, a perforated mold mounted on one of said members, a porous pad interposed between said one member and said mold for sealing the perforations in the latter, the other of said members forcing a quantity of said material into said perforations and into contact with said pad, whereby projections are formed on said material and a roughened impression is formed on said projections, while overflow of the material between said mold and pad is restricted but air is permitted to escape through said pad as said material is forced into said perforations.

2. In apparatus for molding plastic material under heat and pressure, a pair of relatively movable pressure members, a mold mounted on one of said members and comprising a plurality of perforated plates, at least one of which is rigidly secured to said one member, a porous pad interposed between said one member and said plates for sealing the perforations in the latter, the other of said members forcing a quantity of said material into said perforations and into contact with said pad, whereby projections are formed on said material and a roughened impression is formed on said projections, while overflow of the material between said mold and pad is restricted but air is permitted to escape through said pad as said material is forced into said perforations.

3. In apparatus for molding plastic material under heat and pressure, a pair of relatively movable press platens, a perforated mold mounted on one of said platens, a porous pad interposed between said one platen and said mold for sealing the perforations in the latter, the other of said platens forcing a quantity of said material into said perforations and into contact with said pad, whereby projections are formed on said material and a roughened impression is formed on said projections, while overflow of the material between said mold and pad is restricted but air is permitted to escape through said pad as said material is forced into said perforations.

4. In apparatus for molding plastic material under heat and pressure, a pair of relatively movable press platens, a mold mounted on one of said platens and comprising a plurality of perforated plates, at least one of which is rigidly secured to said one platen, and at least two of the plates adjacent thereto being removably mounted on said one platen, a porous pad interposed between said one platen and said plates for sealing the perforations in the latter, the other of said platens forcing a quantity of said material into said perforations and into contact with said pad, whereby projections are formed on said material and a roughened impression is formed on said projections, while overflow of the material between said mold and pad is restricted but air is permitted to escape through said pad as said material is forced into said perforations.

5. In apparatus for molding plastic material under heat and pressure, a pair of relatively movable press platens, a mold mounted on one of said platens and comprising a plurality of interlocking perforated plates removably mounted on said one platen, a porous pad removably mounted on said one platen and interposed between said one platen and said plates for sealing the perforations in the latter, means engaging said pad for removing said plates and pad together from said one platen, the other of said platens forcing a quantity of said material into said perforations and into contact with said pad, whereby projections are formed on said material and a roughened impression is formed on said projections, while overflow of the material between said mold and pad is restricted but air is permitted to escape through said pad as said material is forced into said perforations.

6. In apparatus for continuously molding plastic material under heat and pressure, a pair of relatively movable pressure members which are also movable together in an extended pressure path along which molding of the plastic material occurs, a perforated mold mounted on one of said members, a porous pad interposed between said one member and said mold for sealing the perforations in the latter, the other of said members forcing a quantity of said material into said perforations and into contact with said pad, whereby projections are formed on said material and a roughened impression is formed on said projections, while overflow of the material between said mold and pad is restricted but air is permitted to escape through said pad as said material is forced into said perforations.

7. In apparatus for continuously molding plastic material under heat and pressure, a pair of relatively movable pressure members which are also movable together in an extended arcuate pressure path along which molding of the plastic material occurs, one of said members comprising a rotatable drum, a perforated mold mounted on said drum, a porous pad interposed between said drum and said mold to seal the perforations in the latter, the other of said members comprising a flexible, endless pressure band looped around a portion of said drum for movement therewith along said path, said band forcing a quanttiy of said material into said perforations and into contact with said pad, whereby projections are formed on said material and a roughened impression is formed on said projections while overflow of the material between said mold and pad is restricted but air is permitted to escape through said pad as said material is forced into said perforations.

8. In a method of molding plastic material under heat and pressure, the steps comprising feeding said material between a pair of relatively movable pressure members and into contact with a perforated mold mounted on one of said members which has a porous pad interposed beneath said mold for sealing the perforations therein, applying pressure with the other of said members to force a quantity of said material into said perforations and into contact with said pad, thereby forming projections on said material and a roughened impression on said projections, while restricting overflow of said material between said mold and pad but permitting air to escape through said pad as said material is forced into said projections.

9. In a method of molding plastic material under heat and pressure, the steps comprising feeding said material between a pair of relatively movable press platens and into contact with a mold comprising a plurality of perforated plates, at least one of which is rigidly secured to one of said platens which has a porous pad interposed beneath said plates for sealing the perforations therein, applying pressure with the other of said platens to force a quantity of said material into said perforations and into contact with said pad, thereby forming projections on said material and a roughened impression on said projections, while restricting overflow of said material between said mold and pad but permitting air to escape through said pad as said material is forced into said perforations, stripping the material from said rigidly secured plate and a plate adjacent one end thereof, stripping the material and plate adjacent the other end of said rigidly secured plate together from said pad, and reversing the positions of said adjacent plates.

10. In a method of molding plastic material, the steps comprising feeding said material between a pair of relatively movable press platens and into contact with a mold comprising a plurality of interlocked perforated plates removably mounted on one of said platens which has a porous pad removably mounted thereon and interposed beneath said pleates for sealing the perforations therein, applying pressure with the other of said platens to force a quantity of said material into said perforations and into contact with said pad, thereby forming projections on said material and a roughened impression on said projections, while restricting overflow of said material between said plates and said pad but permitting air to escape through said pad as said material is forced into said perforations, stripping the material from all but one of said plates and removing the others of said plates and underlying pad together from said one platen to reposition said one plate and pad.

11. In a method of continuously molding plastic material, the steps comprising continuously feeding said material between a pair of relatively movable pressure members which are also movable together in an extended pressure path along which molding of the plastic material occurs, said material making contact with a perforated mold mounted on one of said members which has a porous pad interposed beneath said mold for sealing the perforations therein, continuously applying pressure with the other of said members to force a quantity of said material into said perforations and into contact with said pad, thereby forming projections on said material and a roughened impression on said projections, while restricting overflow of said material between said mold and pad but permitting air to escape through said pad as said material is forced into said projections.

12. In a method of continuously molding plastic material, the steps comprising continuously feeding said material between a pair of relatively movable pressure members, one of said members comprising a rotating drum and the other a flexible, endless pressure band which is also movable with said drum in an extended arcuate pressure path along which molding of the plastic material occurs, said material making contact with a perforated mold mounted on said drum which has a porous pad interposed beneath said mold for sealing the perforations therein, continuously applying pressure with said band which is looped around a portion of said drum for movement therewith along said path to force a quantity of said material into said perforations and into contact with said pad, thereby forming projections on said material and a roughened impression on said projections, while restricting overflow of said material between said mold and said pad but permitting the escape of air through said pad as said material is forced into said perforations, and continuously stripping said material from said mold.

References Cited in the file of this patent

UNITED STATES PATENTS

| | | |
|---|---|---|
| 2,142,972 | Bierer | Jan. 3, 1939 |
| 2,446,771 | Knowland | Aug. 10, 1948 |
| 2,536,316 | Schwarz et al. | Jan. 2, 1951 |